(12) United States Patent
Klugmann

(10) Patent No.: US 11,187,799 B2
(45) Date of Patent: Nov. 30, 2021

(54) RADAR DEVICE

(71) Applicant: S&AO Limited, Exeter (GB)

(72) Inventor: Dirk Klugmann, Didcot (GB)

(73) Assignee: S&AO Limited, Exeter (GB)

(*) Notice: Subject to any disclaimer, the term of this patent is extended or adjusted under 35 U.S.C. 154(b) by 0 days.

(21) Appl. No.: 16/920,104

(22) Filed: Jul. 2, 2020

(65) Prior Publication Data

US 2020/0341139 A1 Oct. 29, 2020

Related U.S. Application Data

(63) Continuation of application No. PCT/GB2018/053532, filed on Dec. 6, 2018.

(30) Foreign Application Priority Data

Jan. 2, 2018 (GB) .................................... 1800025

(51) Int. Cl.
*G01S 13/95* (2006.01)
*G01S 7/4861* (2020.01)
*H04B 1/44* (2006.01)

(52) U.S. Cl.
CPC ............ *G01S 13/95* (2013.01); *G01S 7/4861* (2013.01); *H04B 1/44* (2013.01)

(58) Field of Classification Search
CPC .......... G01F 23/284; G01S 7/03; G01S 7/032; G01S 7/034; G01S 7/35; G01S 13/88; G01S 13/95; H04B 1/44
See application file for complete search history.

(56) References Cited

U.S. PATENT DOCUMENTS

| 4,216,387 A * | 8/1980 | Reed ......................... H03K 4/06 |
| | | 327/100 |
| 4,931,799 A * | 6/1990 | Wen ......................... H01Q 21/24 |
| | | 342/110 |

(Continued)

FOREIGN PATENT DOCUMENTS

| EP | 2690455 | 1/2014 |
| EP | 3239736 | 11/2017 |

(Continued)

OTHER PUBLICATIONS

WIPO, International Search Report and Written Opinion in corresponding PCT application PCT/GB2018/053532, dated Apr. 1, 2019.

(Continued)

*Primary Examiner* — Peter M Bythrow
(74) *Attorney, Agent, or Firm* — Ryan Alley IP

(57) ABSTRACT

A radar device for providing data related to atmospheric conditions comprising a transceiver (10) with a single input/output port, the transceiver arranged to generate a frequency modulated continuous radar wave signal and direct it via the single input/output port to a first switch (20), the first switch arranged to direct the signal to a transmission branch including a first antenna (50) for transmission thereof, the radar device further comprising a receiving branch, separate from the transmission branch, arranged to direct received reflected radar waves and direct them as signals to the single input/output port of the transceiver via the first switch, wherein the first switch is arranged to isolate the transmission branch from the receiving branch.

20 Claims, 3 Drawing Sheets

(56) References Cited

U.S. PATENT DOCUMENTS

| | | | | |
|---|---|---|---|---|
| 5,596,325 | A * | 1/1997 | Maas | G01S 7/032 342/28 |
| 6,362,777 | B1 * | 3/2002 | Kawakami | G01S 7/28 342/104 |
| 9,417,315 | B2 * | 8/2016 | Palmer | G01S 7/28 |
| 2006/0017606 | A1 * | 1/2006 | Hayata | H03B 19/14 342/41 |
| 2009/0015465 | A1 * | 1/2009 | Kanaya | H03D 9/0633 342/200 |
| 2009/0174596 | A1 * | 7/2009 | Gekat | H01Q 21/245 342/26 R |
| 2009/0206945 | A1 * | 8/2009 | Wagner | H03H 7/461 333/101 |
| 2012/0098698 | A1 * | 4/2012 | Reuter | G01S 7/03 342/200 |
| 2012/0154203 | A1 * | 6/2012 | Vacanti | G01S 13/44 342/149 |
| 2012/0188917 | A1 * | 7/2012 | Knox | H01Q 9/0435 370/277 |
| 2012/0249363 | A1 * | 10/2012 | Kolinko | H01Q 19/175 342/179 |
| 2013/0016003 | A1 | 1/2013 | Stirling-Gallacher et al. | |
| 2013/0027240 | A1 * | 1/2013 | Chowdhury | G01S 13/931 342/94 |
| 2013/0050013 | A1 * | 2/2013 | Kobayashi | H03L 7/093 342/118 |
| 2014/0047896 | A1 * | 2/2014 | Griessbaum | G01S 7/4021 73/1.73 |
| 2014/0085132 | A1 * | 3/2014 | Jirskog | G01S 13/88 342/124 |
| 2014/0266866 | A1 * | 9/2014 | Swirhun | G01S 7/03 342/188 |
| 2014/0278109 | A1 | 9/2014 | Henderson et al. | |
| 2014/0292563 | A1 * | 10/2014 | Palmer | G01S 7/032 342/26 R |
| 2015/0002330 | A1 * | 1/2015 | Binzer | G01S 7/032 342/175 |
| 2015/0084808 | A1 * | 3/2015 | Vacanti | G01S 13/02 342/122 |
| 2015/0268328 | A1 * | 9/2015 | Johnson | G01S 7/02 342/21 |
| 2016/0327633 | A1 * | 11/2016 | Kumar Y.B. | G01S 7/35 |
| 2017/0123059 | A1 * | 5/2017 | Asanuma | G01S 13/343 |
| 2017/0131385 | A1 * | 5/2017 | Kurono | G01S 13/584 |
| 2017/0160381 | A1 * | 6/2017 | Cho | G01S 7/40 |
| 2018/0196124 | A1 * | 7/2018 | Vacanti | G01S 7/032 |
| 2018/0252807 | A1 * | 9/2018 | Fox | G01S 13/904 |
| 2018/0335518 | A1 * | 11/2018 | Fox | G01S 7/025 |
| 2018/0372529 | A1 * | 12/2018 | Welle | G01F 23/284 |

FOREIGN PATENT DOCUMENTS

| | | |
|---|---|---|
| JP | 2006258580 | 9/2006 |
| WO | 2017187330 | 11/2017 |

OTHER PUBLICATIONS

UK IPO, Search Report in corresponding GB application 1800025.7, dated Oct. 17, 2018.

* cited by examiner

RADAR DEVICE

RELATED APPLICATIONS

This application claims priority under 35 U.S.C. § 120 to, and is a continuation of, co-pending International Application PCT/GB2018/053532, filed Dec. 6, 2018 and designating the US, which claims priority to GB Application 1800025.7, filed Jan. 2, 2018, such GB Application also being claimed priority to under 35 U.S.C. § 119. These GB and International applications are incorporated by reference herein in their entireties.

BACKGROUND

Field

The present invention relates generally to a radar device and a method of operating such a device for providing data relating to atmospheric conditions, and finds particular, although not exclusive, utility in weather forecasting.

Radar devices have been used for many years to help forecast weather and for directing aeroplanes to less turbulent and cloudy areas of the sky. However, the known systems are complex and elaborate, and therefore expensive to manufacture.

SUMMARY

The present invention offers a device which is able to overcome these problems. In a first aspect, the invention provides a radar device for providing data related to atmospheric conditions comprising a transceiver with a single input/output port, the transceiver arranged to generate a frequency modulated continuous radar wave signal and direct it via the single input/output port to a first switch, the first switch arranged to direct the signal to a transmission branch including a first antenna for transmission thereof, the radar device further comprising a receiving branch, separate from the transmission branch, arranged to direct received reflected radar waves and direct them as signals to the single input/output port of the transceiver via the first switch, wherein the first switch is arranged to isolate the transmission branch from the receiving branch.

The first switch may be arranged to alternately connect only the transceiver with the transmission branch, and the transceiver with the receiving branch. The first switch may be a circulator. The radar device may further comprise a transmitter amplifier in the transmission branch. The transmitter amplifier may be arranged to provide a gain of approximately 30 dB, although other magnitudes are contemplated. The radar device may further comprise a receiver amplifier in the receiving branch. The receiver amplifier may be a low noise amplifier. The receiver amplifier may be arranged to provide a gain of approximately 50 dB, although other magnitudes are contemplated.

The separation of the transmission and receiving branches may enable amplification to be added to the generated signal and separately to the received signal, in order to increase the overall sensitivity of the system.

The first antenna may be arranged to also receive the reflected radar waves. In this regard, the radar device may further comprise a second switch arranged to direct the transmission signals to the first antenna.

In other words, a single antenna may be used to transmit and receive signals.

The second switch may be arranged to direct the received signals from the reflected radar waves to the receiving branch, and the second switch may be arranged to isolate the transmission branch from the receiving branch.

The second switch may be arranged to alternately connect only the first antenna with the transmission branch, and the first antenna with the receiving branch.

The second switch may be a circulator.

The radar device may further comprise a separate second antenna in the receiving branch to receive the reflected radar waves.

The radar device may further comprise a digital analyser for processing the received signals. This may include a display, data storage and a communications device.

The radar device may further comprise an upconverter for increasing the frequency of the generated radar wave signal in the transmission branch. The upconverter may be arranged to increase the frequency in the range 6 to 60 MHz although other frequencies are contemplated.

The radar device may further comprise an upconverter for increasing the frequency of the received signal. The upconverter may be arranged to increase the frequency by approximately 100 kHz.

Either or both upconverters may be useful to shift the received signals away from unwanted "noise" created close to the transmitting frequency which is associated with short distances in the signal evaluation. This may increase the sensitivity of the device.

The transceiver may be configured to generate the radar wave signal in a reverse saw-tooth arrangement, such that the frequency of the radar wave signal decreases gradually over time after an initial, relatively instantaneous, increase.

The transceiver may be configured to generate the radar wave signal at a frequency of approximately 35 GHz. For instance, it may be in the range 35.2 to 35.5 GHz, although other frequencies are contemplated.

The first switch and transceiver may be integrated into a single unit.

In a second aspect, the invention provides a method of operating a radar device according to the first aspect, for providing data related to atmospheric conditions, comprising the steps of generating a frequency modulated continuous radar wave signal, directing the signal via the single input/output port to the first switch, and directing the signal to the first antenna via a transmission branch, the method further comprising the steps of receiving reflected radar waves and directing them via a receiving branch and the first switch to the transceiver via the single input/output port.

The method may further comprise the step of processing the received signals. The method may further comprise the step of increasing the frequency of the generated radar wave signal before it reaches the first antenna. The method may further comprise the step of increasing the frequency of the received signal before it reaches the transceiver. The method may further comprise the step of generating the radar wave signal in a reverse saw-tooth arrangement, such that the frequency of the radar wave signal decreases gradually over time after an initial, relatively instantaneous, increase.

The frequency of 35.2-35.5 GHz, which is an International Telecommunications Union (ITU) approved waveband for meteorological observations, allows the penetration and resolution of clouds to be greatly increased.

Most conventional radar devices, including "cloud profilers", use pulsed radar, wherein the receiving module is closed for a short time to protect the receiver from the full strength of the transmitted signal.

The reversed saw-tooth profile of the FMCW waveform acts together with the up-conversion to increase greatly the sensitivity at which reflected signals can be discriminated from system noise. The waveform may be described as a scanning waveform.

The term antenna may include an aerial.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
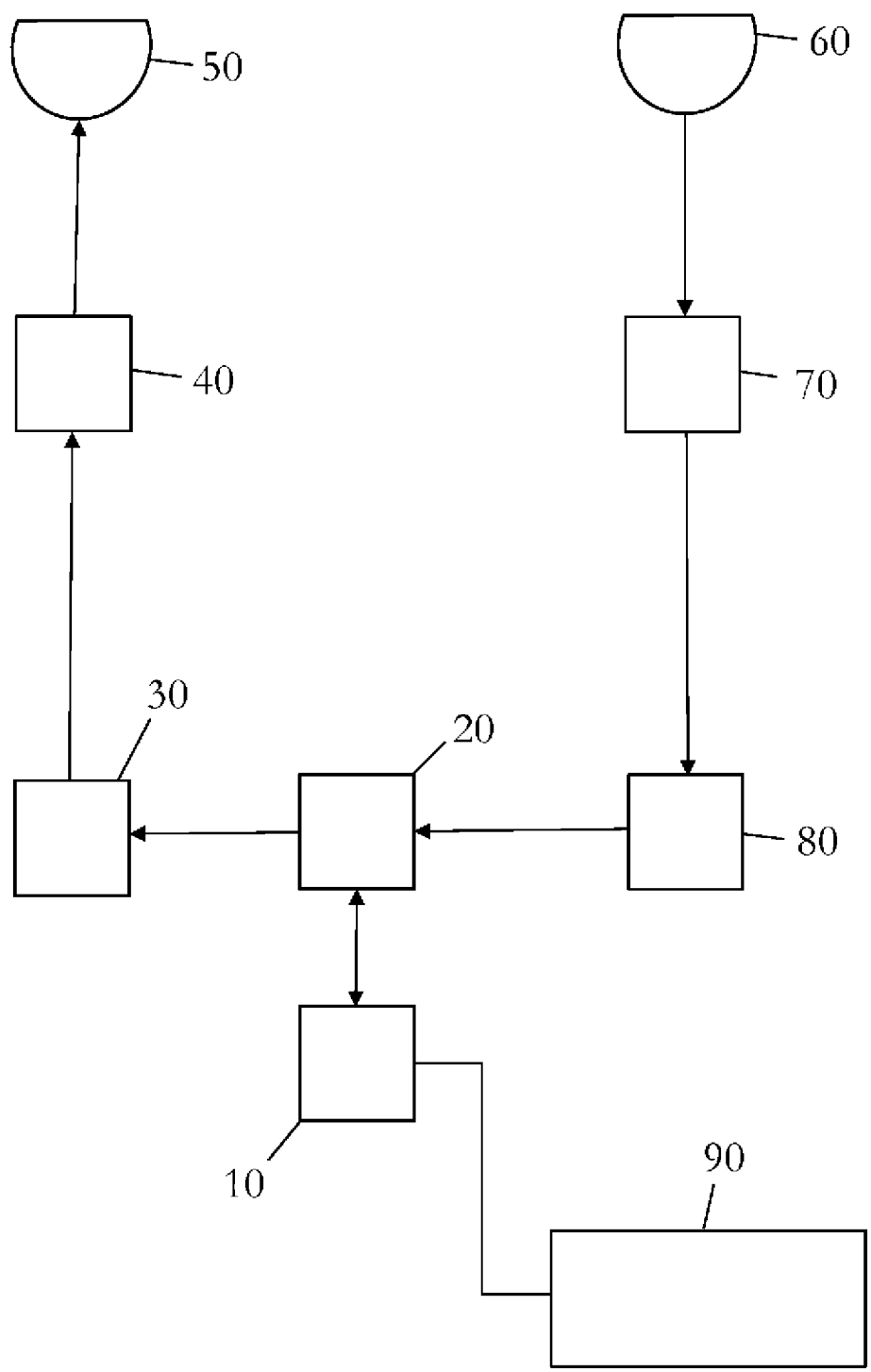
FIGS. 1 and 2 are schematic diagrams of radar devices.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

In FIG. 1, transceiver 10 generates a signal which is sent to the switch 20. The switch 20 allows an input from the transceiver to be only directed to the transmission side of the device 30, 40, 50, and not to the receiving side of the device 60, 70, 80. The switch may be a circulator. A transmission upconverter 30 allows for the frequency of the signal to be increased by approximately 6 to 60 MHz, although other frequency magnitudes are contemplated. It then is passed to a transmission amplifier 40 for onward broadcast via a transmission antenna 50. Either of the transmission upconverter 30 and the transmission amplifier 40 are optionally present.

After the radar waves have been scattered and reflected by a target or targets, for example, within the atmosphere some will be collected by the receiving antenna 60. This received signal will be amplified by a receiving amplifier 70 before being directed to a receiving upconverter 80 and onward to the switch 20. Either of the receiving upconverter 80 and the receiving amplifier 70 are optionally present. The switch 20 is arranged to only allow inputs received from the receiving side to be directed to the transceiver 10 and not to the transmission side of the device.

Figure 2:
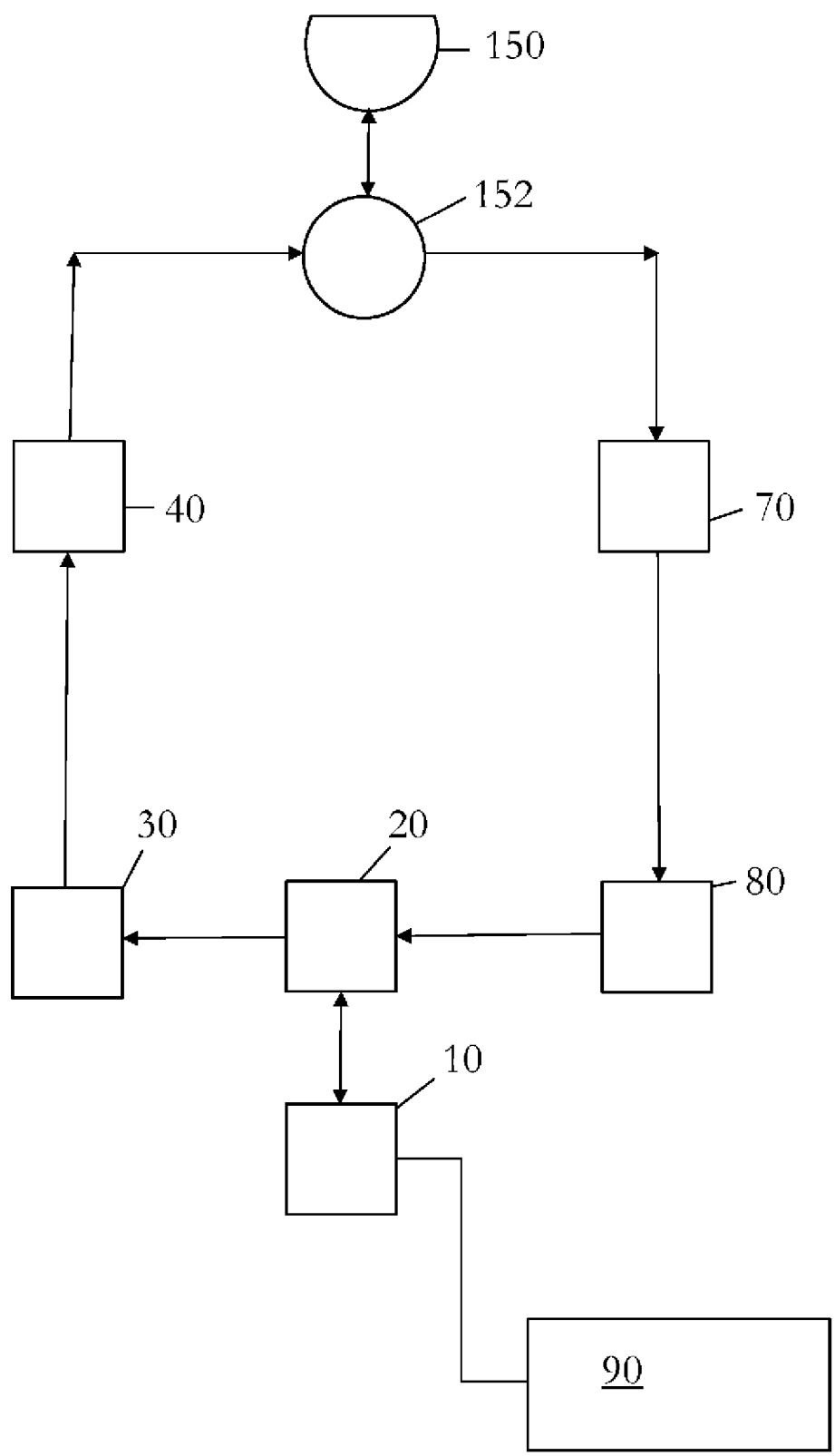

It is to be understood that instead of a transmission antenna 50 and a separate receiving antenna 60, a single transmission/receiving antenna may be provided. This is shown in FIG. 2 where the transmission 50 and receiving 60 antennae are replaced with a single antenna 150. The single antenna 150 is connected to both the transmission side (or branch) and the receiving side (or branch) of the device via a switch 152. The switch 152 may be a circulator. The switch 152 is arranged to only allow inputs received from the antenna 150 to be directed to the receiving side and not to the transmission side of the device. Likewise, it is arranged to only allow signals generated by the transceiver to reach the single antenna 150 via the transmission side and not via the receiving side.

For either case (single or twin antennae) the received signal may have its frequency shifted by the upconverter 80 by approximately 100 KHz, although other magnitudes are contemplated. The signal is also processed either in the transceiver 10 and/or in a digital processor/display 90.

One of the aims of the device is to obtain reflected radar waves from relatively close atmospheric phenomena. Traditional pulse radar systems have trouble receiving this data because the receiving side of the device is closed to prevent it picking-up the transmitted signal. The present device may overcome this, supported by, but not necessarily exclusively relying on, the use of the circulator and separate antennae. Moreover, the receiving upconverter 80 may shift the frequency of the received signal away from the frequency of the transmitted signal. Alternatively, and/or additionally, the transmitted signal may be increased in frequency, away from the signal output by the transceiver, by means of the transmission upconverter 30. Finally, it is also possible to generate the transmission signal in a reverse wave form as shown in FIG. 4.

Figure 3:
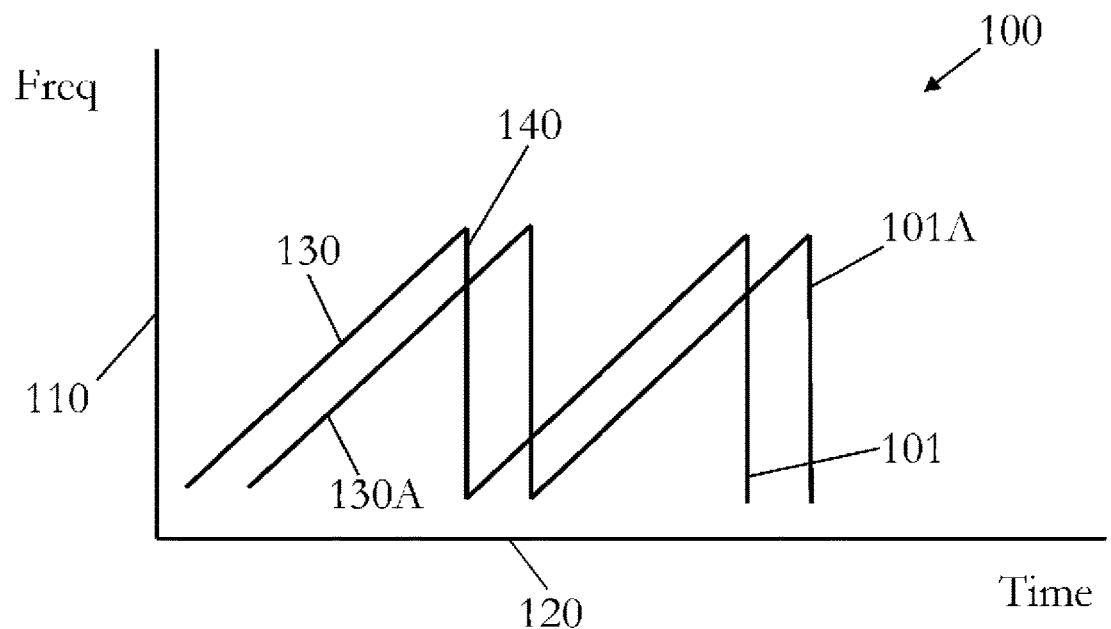
FIGS. 3 and 4 are graphs of transmitted and received radar signals.

In FIG. 3, the standard saw-tooth wave forms 100 are shown on a graph with frequency on the y-axis 110 and time on the x-axis 120. The transmitted wave form 101 comprises a sloping section 130 where the signal increases in frequency gradually from a base line over time followed by a substantially instantaneous reduction 140 back to the base line. This is repeated forming a "saw tooth" profile.

The received wave form 101A is also shown. It has the same saw tooth profile. Since the received signal has been received after the transmitted signal the wave form is shown shifted to the right slightly. Such received signals may have interference due to unwanted "noise" created close to the transmitting frequency which are associated with short distances in the signal evaluation. To mitigate this, it is possible to upconvert the receive signal with the upconverter to move the received signal 101A away from the x-axis. However, there is a limit to how far the received signal can be upconverted as otherwise it can cause problems in that the two signals (transmitted 101 and received 101A) are relatively close to one another such that it is difficult to distinguish the received signal from the transmitted signal. In this regard, the sloping section 130A of the received signal will be closer to the sloping section 130 of the transmitted signal.

Figure 4:
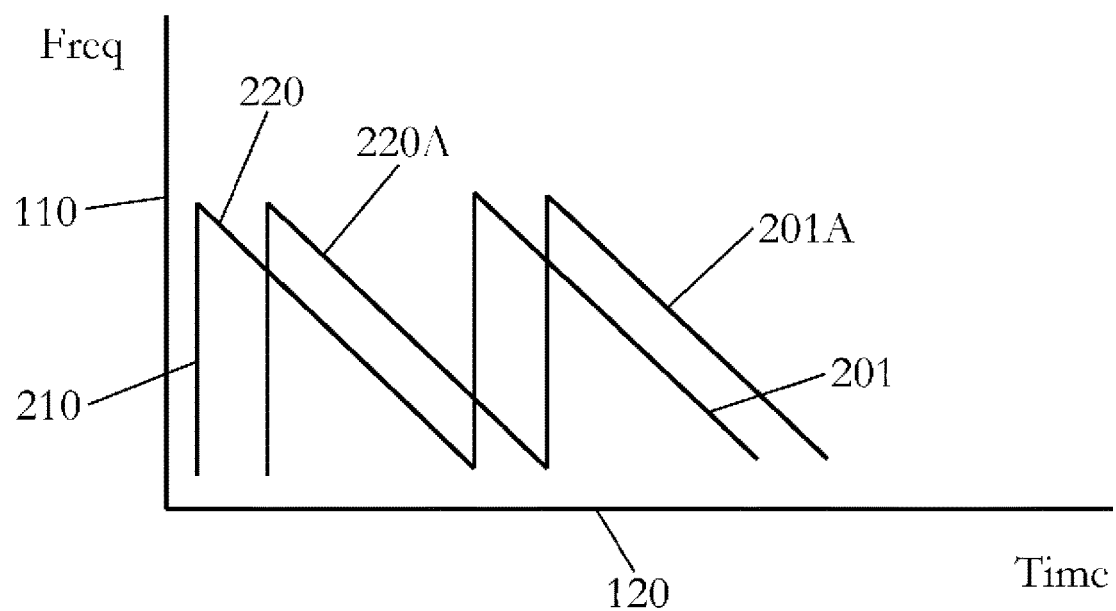

An alternative solution is to transmit the signal in a reverse saw-tooth wave form 201 as shown on a graph in FIG. 4 where frequency is on the y-axis 110 and time is on the x-axis 120. The wave form 201 comprises a signal substantially instantaneously increasing in frequency 210 from a base line followed by a sloping section 220 gradually decreasing in frequency back to the base line. This is repeated producing the "reverse saw tooth" profile.

The received signal 201A is shown, again, slightly to the right of the transmitted signal 201. It has the same reverse saw tooth profile. This time, if the received signal 201a is upconverted such that the wave form is shifted away from the x-axis it will be further away from the transmitted signal allowing the two to be more clearly distinguished. In this regard, the sloping section 220A of the received signal will be further away from the sloping section 220 of the transmitted signal.

The invention claimed is:

1. A radar device for providing data related to atmospheric conditions comprising:
a transceiver with a single input/output port, the transceiver arranged to generate a frequency modulated continuous radar wave signal and direct it via the single input/output port to a first switch, the first switch arranged to direct the signal to a transmission branch including a first antenna for transmission thereof; and
a receiving branch, separate from the transmission branch, arranged to direct received reflected radar waves and direct them as signals to the single input/output port of the transceiver via the first switch, wherein the first switch is arranged to isolate the transmission branch from the receiving branch.

2. The radar device of claim 1, wherein the first switch is a circulator.

3. The radar device of claim 1, further comprising:
a transmitter amplifier in the transmission branch.

4. The radar device of claim 3, wherein the transmitter amplifier is arranged to provide a gain of approximately 30 dB.

5. The radar device of claim 1, further comprising:
a receiver amplifier in the receiving branch.

6. The radar device of claim 5, wherein the receiver amplifier is arranged to provide a gain of approximately 50 dB.

7. The radar device of claim 1, wherein the first antenna is arranged to also receive the reflected radar waves.

8. The radar device of claim 7, further comprising:
a second switch arranged to direct the transmission signals to the first antenna.

9. The radar device of claim 8, wherein the second switch is arranged to direct the received signals from the reflected radar waves to the receiving branch, and wherein the second switch is arranged to isolate the transmission branch from the receiving branch.

10. The radar device of claim 8, wherein the second switch is a circulator.

11. The radar device of claim 1, further comprising:
a separate second antenna in the receiving branch to receive the reflected radar waves.

12. The radar device of claim 1, further comprising:
a digital analyser for processing the received signals.

13. The radar device of claim 1, further comprising:
an upconverter for increasing the frequency of the generated radar wave signal in the transmission branch.

14. The radar device of claim 1, further comprising:
an upconverter for increasing the frequency of the received signal.

15. The radar device of claim 1, wherein the transceiver is configured to generate the radar wave signal in a reverse saw-tooth arrangement, such that the frequency of the radar wave signal decreases gradually over time after an initial, relatively instantaneous, increase.

16. A method of operating a radar device for providing data related to atmospheric conditions, the radar device comprising a transceiver with a single input/output port, the transceiver arranged to generate a frequency modulated continuous radar wave signal and direct it via the single input/output port to a first switch, the first switch arranged to direct the signal to a transmission branch including a first antenna for transmission thereof, the radar device further comprising a receiving branch, separate from the transmission branch, arranged to direct received reflected radar waves and direct them as signals to the single input/output port of the transceiver via the first switch, wherein the first switch is arranged to isolate the transmission branch from the receiving branch, the method comprising the steps of:
generating a frequency modulated continuous radar wave signal;
directing the signal via the single input/output port to the first switch;
directing the signal to the first antenna via a transmission branch; and
receiving reflected radar waves and directing them via a receiving branch and the first switch to the transceiver via the single input/output port.

17. The method of claim 16, further comprising:
the step of processing the received signals.

18. The method of claim 16, further comprising:
the step of increasing the frequency of the generated radar wave signal before it reaches the first antenna.

19. The method of claim 16, further comprising:
the step of increasing the frequency of the received signal before it reaches the transceiver.

20. The method of claim 16, further comprising:
the step of generating the radar wave signal in a reverse saw-tooth arrangement, such that the frequency of the radar wave signal decreases gradually over time after an initial, relatively instantaneous, increase.

\* \* \* \* \*